June 9, 1953     F. DER YUEN     2,641,374
CONTAINER
Filed Oct. 29, 1949
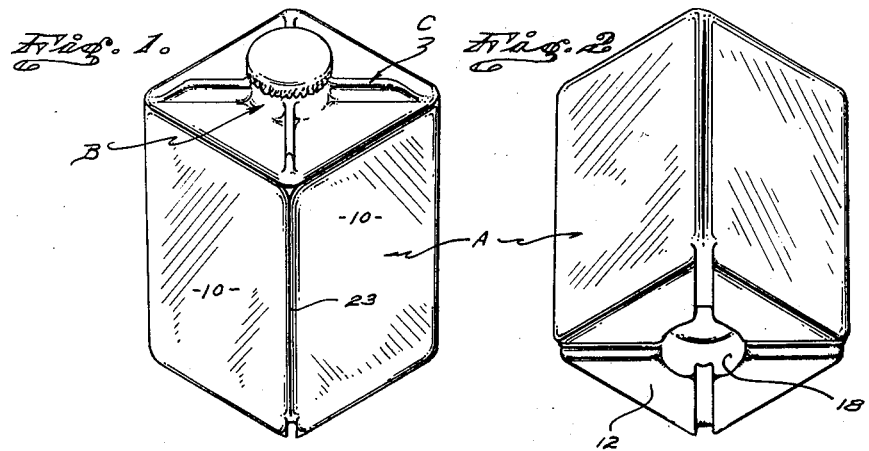
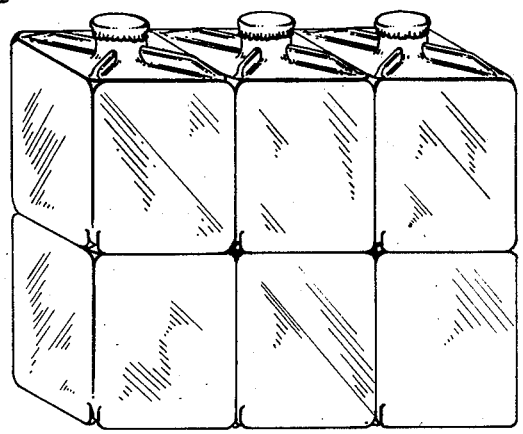
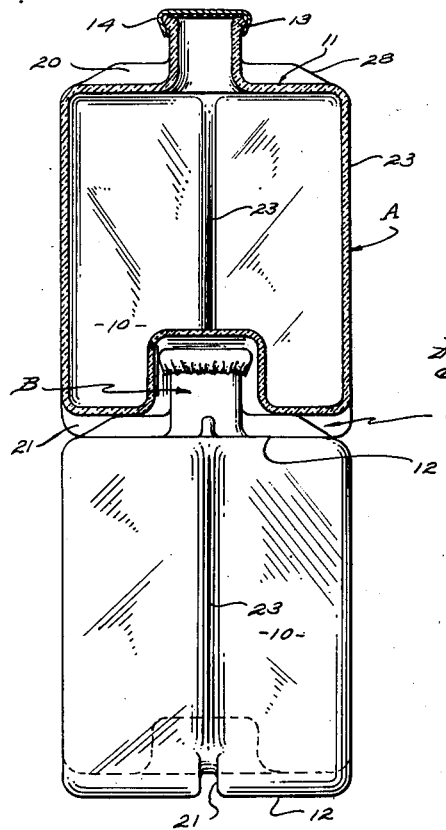
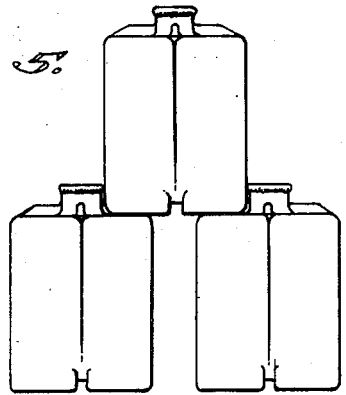
INVENTOR.
Frank DerYuen
BY
*Attorney*

Patented June 9, 1953

2,641,374

UNITED STATES PATENT OFFICE 2,641,374

CONTAINER

Frank Der Yuen, Running Springs, Calif., assignor of one-half to Yee Sing Chun, Oakland, Calif.

Application October 29, 1949, Serial No. 124,311

2 Claims. (Cl. 215—10)

This invention is concerned with a container and is is a general object of the invention to provide a container particularly practical for manufacture from glass, or the like, and which is easy and convenient to handle and is such as to occupy a minimum of space.

The container provided by this invention may be used to handle various products, for example liquids generally. However, it is particularly practical for handling beer or like beverages and it can be advantageously manufactured of glass, or the like. Because of these circumstances the invention will be described as a container for beer, or the like, and it will be referred to as a glass or one-piece container.

Various liquids, and particularly beer and like beverages, require considerable handling or transportation, and before use they are generally chilled. The chilling of beer usually involves storing the sealed containers in a refrigerator and with ordinary containers commonly used for the handling of beer this requires a very large refrigerating space compared to the quantity of beer that is chilled. The inefficient utilization of space is due primarily to the fact that beer bottles are commonly round in cross sectional configuration, and therefore do not nest or pack together sidewise without considerable loss of space, and they are characterized by tops and bottoms of widely different character and such that they cannot be stacked or packed one on top of the other without the aid of guides or auxiliary equipment in addition to the bottles themselves.

The container provided by this invention is characterized by a body which is polygonal, preferably square, in plan configuration, and the ends of the body correspond, in fact, are preferably flat and in planes normal to the vertical axis of the body. A neck projects up from the center of the top end of the body and a neck receiving socket is provided centrally in the bottom of the body. The present invention provides locking or keying means on each container and in a preferred application one or more keys is provided on the top of each container and corresponding recesses are provided in the bottom of the container. In one form of the invention there are keys in the form of ribs radiating from the neck toward the corners of the body.

A general object of this invention is to provide a container which can be packed and stacked to advantage and which can be economically and advantageously formed as a one-piece article or unit, as from glass or the like.

Another object of this invention is to provide a container of the general character referred to which is such that a plurality of the containers can be nested together side by side and also end to end with the result that a multiplicity of containers can be arranged in a given space so that the space is utilized to its fullest extent.

It is a further object of the invention to provide a container possessing characteristics such as those above mentioned and which is of such form that it can be easily and conveniently handled, as, for instance, in the course of pouring the contents therefrom.

The various objects and features of my invention will be fully understood from the following detailed description of a typical preferred form and application of the invention, throughout which description reference is made to the accompanying drawings, in which:

Fig. 1 is a perspective view of a container provided by the present invention showing it with one corner in the foreground so that two sides are visible together with the top of the container. Fig. 2 is a view similar to Fig. 1, showing two sides and the bottom of the container. Fig. 3 is a side elevation of two containers embodying the present invention showing them in stacked relation, the lower container being in elevation and the upper container in vertical section. Fig. 4 is a perspective view showing a plurality of containers embodying the invention packed side by side and stacked end to end. Fig. 5 is a view illustrating a plurality of containers provided by the invention shown stacked in a pyramidal form as for purpose of display.

The structure provided by the present invention involves, generally, a body A, a neck B on the body, and keying means C on the body.

The particular body A illustrated in the drawings is polygonal or rectangular in plan configuration and in accordance with the preferred form of the invention it is square in cross sectional configuration. The body A thus formed has flat vertical sides 10 of corresponding size and shape. The body is further characterized by ends, namely a top end 11 and a bottom end 12, and the ends are preferably made to correspond, that is, are made to seat one against the other when containers are stacked end to end, as shown in Fig. 3. In the preferred form of the invention, as shown in the drawings, the ends 11 and 12 are simple, flat elements occurring in planes which are normal to the vertical or longitudinal axis of the container.

The neck B of the container is preferably located centrally on the top end 11 and projects upwardly therefrom. In the preferred form of the invention, as for example, where the container is for handling beer, or the like, it is preferred that the neck be provided at its upper end with a suitable head 13 for the reception of a cap 14 of the type commonly referred to as a crown cap. It is preferred that the neck B be of minimum extent vertically, consistent with providing convenient accessibility to the cap in order to enable the cap to be removed conveniently with the usual opener or device employed for that purpose when removing crown caps from ordinary bottles.

The invention provides a socket 18 in the end opposite that provided with the neck, or, in other words in the bottom 12 of the body, and where the neck is located centrally of the body the socket 18 is located centrally in the bottom 12 and it is made of such size both as to diameter and depth as to receive a capped neck with suitable freedom or working clearance.

The keying means C provided by the present invention is provided or serves to orient the containers in stacked relation and is preferably such as to key and orient them when stacked in registered relationship, as shown in Fig. 3, as well as when they are in a stacked relationship such as is illustrated in Fig. 5. In the form of the invention being described there are one or more key projections on one end of the body and corresponding key receiving recesses in the other end of the body. In the case illustrated the keys are in the form of elongate ribs 20 and are located on the top end 11 of the body, in which case the key receiving recesses 21 are located in the bottom end 12 of the body. In the preferred arrangement where the body is square in plan configuration, as shown in the drawings, there are four rib-shaped keys 20 and they are arranged so that they extend radially from the central axis of the body and are equally spaced around such axis. In the particular case illustrated the keys are in line between the central axis of the body and the corners 23 of the body where the sides 10 join, this arrangement and relationship of parts being clearly illustrated in Figs. 1 and 4 of the drawings. The key receiving recesses 21 are shaped and proportioned and are also located to correspond to the key ribs 20 and in the case being described they are so located in the bottom 12 as to extend radially from the central axis of the body to the corners thereof and they extend from the neck receiving socket 18 to the corners 23. It is to be understood that in practice the key receiving recesses 21 are made slightly wider and deeper than the corresponding dimensions of the keys so that they receive keys with ample freedom or clearance.

In accordance with the preferred form of the invention the various elements of the bottle or container as hereinabove described are shaped and proportioned to facilitate economical manufacture, preferably in ordinary bottle-making machinery, and it is to be understood that the various elements or features referred to may, in practice, be rounded or dressed so that they are free of sharp corners or edges or of other features that may be either disagreeable or dangerous. For example, the outer end portions of the key ribs 20 are preferably beveled or dressed away at 28 as shown throughout the drawings, while the various corners of the body and other parts are suitably rounded.

With the construction above described containers of like size and shape embodying the present invention may be arranged or packed side by side, as shown in Fig. 4 so that there is no loss of space between adjoining containers. Further, the containers may be stacked end to end or one on top of the other to form a pile of any desired height and as they are so stacked the tops and bottoms rest or bear against each other while the necks B enter the sockets 18 and the keys 20 enter the recesses 21. The keys and recesses being related or positioned as above described serve to orient the containers one above the other or in stacked relation so that the sides 10 of stacked containers occur in common planes as will appear from Figs. 3 and 4 of the drawings. Further, with the present invention it is possible to stack the containers in the manner shown in Fig. 5 where they are in a pyramid-like arrangement suitable for display purposes. It will be apparent from Fig. 5 how a substantial number of containers can be stacked in the manner there suggested in the drawings, the keys serving to maintain the containers in the desired relationship while the containers are positioned to form a very stable stack. It is to be observed that with the construction illustrated on sheet 1 of the drawings the ribs 20 not only provide for keying containers relative to each other but they materially strengthen the upper end portion of the containers and where the keys or key ribs are joined to the neck as shown in the drawings the neck is, in effect, graced and reinforced, as well as being effectively guarded or protected. In like manner the lower end portion of the container is materially strengthened and stiffened by the formation that provides the socket 18 and the recesses 21.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A one piece container having a vertical body substantially square in cross sectional configuration and having flat top and bottom ends, a neck projecting upward from the center of the top, the bottom having a central neck receiving socket, and radially disposed keys on the top extending diagonally between the corners of the body and the neck, there being key receiving recesses in the bottom corresponding in size and arrangement with the keys.

2. A one piece container having a vertical body substantially square in cross sectional configuration and having flat top and bottom ends, a neck projecting upward from the center of the top, the bottom having a central neck receiving socket, and elongate rib shaped keys on the top located between the corners of the body and the central axis of the body, there being key receiving recesses in the bottom corresponding in size and arrangement with the keys, the keys being joined to the neck and the recesses being open at the corners of the body.

FRANK DER YUEN.

References Cited in the file of this patent

UNITED STATES PATENTS

| Number | Name | Date |
|---|---|---|
| 2,077,027 | Torras | Apr. 13, 1937 |
| 2,364,007 | Stanton | Nov. 28, 1944 |
| 2,496,093 | Iwata | Jan. 31, 1950 |
| 2,511,876 | Protzeller | June 20, 1950 |

FOREIGN PATENTS

| Number | Country | Date |
|---|---|---|
| 481,737 | Great Britain | Mar. 17, 1938 |